(12) United States Patent
Rathi et al.

(10) Patent No.: US 11,438,663 B1
(45) Date of Patent: Sep. 6, 2022

(54) SMART PLAYER STREAM SWITCHING FOR LIVE CONTENT PLAYBACK AND NAVIGATION BASED ON USER ACTION

(71) Applicant: Sling Media Pvt. Ltd., Bangalore (IN)

(72) Inventors: Ankit Rathi, Maharashtra (IN); Abhinav Puri, Punjab (IN)

(73) Assignee: Sling Media Pvt. Ltd., Bangalore (IN)

( * ) Notice: Subject to any disclaimer, the term of this patent is extended or adjusted under 35 U.S.C. 154(b) by 0 days.

(21) Appl. No.: 17/307,862

(22) Filed: May 4, 2021

(30) Foreign Application Priority Data

Feb. 17, 2021 (IN) .............................. 202141006625

(51) Int. Cl.
*H04N 21/472* (2011.01)
*H04N 21/2187* (2011.01)
*H04N 21/462* (2011.01)
*H04N 21/44* (2011.01)
*H04N 21/437* (2011.01)
*H04N 21/438* (2011.01)

(52) U.S. Cl.
CPC ... *H04N 21/47217* (2013.01); *H04N 21/2187* (2013.01); *H04N 21/437* (2013.01); *H04N 21/438* (2013.01); *H04N 21/44004* (2013.01); *H04N 21/4622* (2013.01)

(58) Field of Classification Search
CPC ......... H04N 21/47217; H04N 21/2187; H04N 21/438; H04N 21/44004; H04N 21/4622

USPC ............................................................ 725/59
See application file for complete search history.

(56) References Cited

U.S. PATENT DOCUMENTS

| 2017/0006314 A1* | 1/2017 | Danovitz | H04L 65/00 |
| 2017/0064404 A1* | 3/2017 | Zane | H04N 21/4316 |
| 2019/0068665 A1* | 2/2019 | Kieft | H04L 67/36 |
| 2021/0219025 A1* | 7/2021 | Sharma | H04N 21/63345 |

* cited by examiner

*Primary Examiner* — Nnenna N Ekpo
(74) *Attorney, Agent, or Firm* — Kilpatrick Townsend & Stockton LLP

(57) ABSTRACT

Techniques are described for transparent switching between live-edge and non-live-edge playback responsive to user navigation. For example, live content is available to a user both via a live stream from a remote live edge server, and via a recorded-live stream from a remote recording server. During playback of a live content stream, a player system uses a warm-up player to continually receive, pre-decode, and pre-buffer the live stream at the live edge to maintain a pre-buffered warm-up stream; and the player system uses a primary player to decode and generate a playback stream for playback. As the user navigates playback between live-edge and non-live-edge locations, the player system can seamlessly switch between generating the playback stream based on the recorded-live stream for non-live-edge playback, or based on the pre-buffered warm-up stream for live-edge playback.

19 Claims, 10 Drawing Sheets

SMART PLAYER STREAM SWITCHING FOR LIVE CONTENT PLAYBACK AND NAVIGATION BASED ON USER ACTION

CROSS-REFERENCE TO RELATED APPLICATIONS

This application claims priority to Indian Provisional Application No. 202141006625, filed on Feb. 17, 2021, entitled "Smart Player Stream Switching For Live Content Playback And Navigation Based On User Action," the disclosure of which is hereby incorporated by reference in its entirety for all purposes.

FIELD

This disclosure relates generally to streaming, playback, and navigation of live content, and, more particularly, to smart transparent stream switching between primary and warm-up players to support live content playback and navigation based on user action.

BACKGROUND

Providers of media content services, such as digital video broadcast (DVB) television content, typically offer such content to consumers in one or more ways. Conventionally, such content tends to be offered either as "live" content streams, or as "on-demand" content streams. For example, live content streams can include the content presently being broadcast over a linearly-scheduled broadcast television channel, or the like. Conventionally, customers may be permitted only to view such live content streams at their respective "live edge" (i.e., the ends of the content streams, as is presently being broadcast live over corresponding television channels), and they may not be able to navigate such content streams by pausing, rewinding, or the like. As one example, live DVB content streams can be provided via one or more third-party content distribution servers (CDNs). When an end user content player requests a live television channel, the player can locate an appropriate CDN and begin requesting streaming of corresponding content from that CDN based on DVB protocols, and the like.

In contrast, on-demand content streams can include any pre-recorded content, such as on-demand movies, on-demand television program episodes, on-demand sporting events, previously recorded live content, etc. Customers typically access such content streams via one or more storage devices, and interfaces may be available to permit the customers to navigate such content by pausing, rewinding, fast-forwarding, etc. In some cases, the on-demand content is accessed from local storage, such as from a local digital video recorder (DVR) integrated with, or in communication with, an end user content player. Some media content services providers offer pre-recorded content via network-accessible (e.g., cloud-based) digital video recorders. For example, an end user content player can access on-demand content streams by request via a provider network from a cloud-based DVR server.

Recently, some media content services providers have used various techniques to facilitate navigation of live content in much the same manner as navigation of on-demand content. For example, while watching a live sporting event, such techniques can permit the user to pause and resume playback, restart from the beginning of the program, seek to different playback locations, rewind, fast-forward, etc. Conventionally, such techniques tend to operate in a manner similar to that of on-demand handling. For example, some conventional techniques use local storage at the end user content player, such as a circular buffer, to support limited navigation of live content streams, such as to support pause and resume. According to some other conventional techniques, the media content services provider uses its network-accessible DVRs to record some live content streams as they are being broadcast (e.g., when permitted by the broadcaster). When a consumer requests one of those live content streams, the end user content player accesses a corresponding "live-recorded" content stream via an appropriate remote DVR, rather than accessing the live content stream directly from a CDN.

Providing access to the live content via the live-recorded stream can be desirable for various reasons. One reason is that it tends to be less expensive for a media content services provider to provide access to the live-recorded content streams to large numbers of customers via its own network-accessible DVRs, rather than providing direct access to the live content streams via third-party CDNs. Another reason is that providing content via the live-recorded content streams can allow end users to access a full slate of navigation options (e.g., pause and resume playback, restart from the beginning of the program, seek to different playback locations, rewind, fast-forward, etc.). However, conventionally, the live-recorded content stream is appreciably (e.g., up to one minute) delayed with respect to the live content stream, such that an end user watching the live-recorded stream may be unable to watch up all the way to the live edge of what is being broadcast.

SUMMARY

Embodiments of the present invention relate to smart transparent stream switching between primary and warm-up players to support live-stream playback and navigation based on user action. For example, live content is available to a user both via a live stream from a live edge server and via a recorded-live stream from a recording server (which tends to be delayed with respect to the live stream). The user can opt (e.g., using navigation controls) to playback a live content stream either at the live edge or at some other location using a media player system. During the playback, the media player system uses a warm-up player to continually receive, pre-decode, and pre-buffer the live stream at the live edge to maintain a pre-buffered warm-up stream. The media player system also uses a primary player to decode and generate a playback stream for playback. When the user navigates playback between live-edge and non-live-edge locations, the media player system can seamlessly switch between generating the playback stream from the recorded-live stream for non-live-edge playback, and generating the playback stream from the pre-buffered warm-up stream for live-edge playback.

According to a first set of embodiments, a method is provided for media playback. The method includes: receiving a first user interaction command at a first time indicating user navigation of playback of live programming content to a first playback location prior to a present live edge; generating a warm-up stream by pre-decoding, using a warm-up media player, a live content stream obtained from a live edge server as published via a provider communication network, such that the warm-up stream maintains at least the present live edge of the live programming content; first outputting a playback stream, by a primary media player responsive to the first user interaction command at the first time, by decoding a recorded-live content stream obtained from a recording server via the provider communication network and generated at the remote recording server from the live content stream as the live content stream is being published by the live edge server, such that the playback stream at the first time represents playback of the live programming content at the first playback location in accordance with the first user interaction command; receiving a second user interaction command at a second time during the first outputting, the second user interaction command indicating user navigation of the playback of the live programming content to a second playback location corresponding to the present live edge; and second outputting the playback stream, by the primary media player responsive to the second user interaction command at the second time, by decoding the warm-up stream obtained from the warm-up player, such that the playback stream at the second time represents playback of the live programming content at the second playback location in accordance with the second user interaction command.

According to a second set of embodiments, a media playback system is provided. The system includes: a warm-up media player to couple with a live edge server via a provider communication network to obtain a live content stream comprising live programming content in accordance with a first user interaction command indicating a request for the live programming content, and to pre-decode the live content stream to generate a warm-up stream; a primary media player to couple with a remote recording server via the provider communication network to obtain a recorded-live content stream corresponding to the live content stream in accordance with the first user interaction command and concurrent with the warm-up media player generating the warm-up stream; and a smart stream controller to direct the primary media player to output a playback stream based on a present playback state of the plurality of playback states by decoding and outputting the recorded-live content stream as the playback stream when the present playback state is any of a first subset of the plurality of playback states, and decoding and outputting the warm-up stream as the playback stream when the present playback state is the second playback state any of a second subset of the plurality of playback states, the first and second subsets being disjoint subsets, the present playback state being user-navigable during outputting of the playback stream.

According to another set of embodiments, another system is provided for media playback. The system includes: one or more processors to implement a warm-up media player and a primary media player; and a non-transient memory having processor-readable instructions stored thereon, which, when executed, cause the one or more processors to perform steps. The steps include: receiving a first user interaction command at a first time indicating user navigation of playback of live programming content to a first playback location prior to a present live edge; directing the warm-up media player to generate a warm-up stream by pre-decoding a live content stream obtained from a live edge server as published via a provider communication network, such that the warm-up stream maintains at least the present live edge of the live programming content; directing the primary media player to first output a playback stream, responsive to the first user interaction command at the first time, by decoding a recorded-live content stream obtained from a recording server via the provider communication network and generated at the remote recording server from the live content stream as the live content stream is being published by the live edge server, such that the playback stream at the first time represents playback of the live programming content at the first playback location in accordance with the first user interaction command; receiving a second user interaction command at a second time during the first outputting, the second user interaction command indicating user navigation of the playback of the live programming content to a second playback location corresponding to the present live edge; and directing the primary media player to second output the playback stream, responsive to the second user interaction command at the second time, by decoding the warm-up stream obtained from the warm-up player, such that the playback stream at the second time represents playback of the live programming content at the second playback location in accordance with the second user interaction command.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
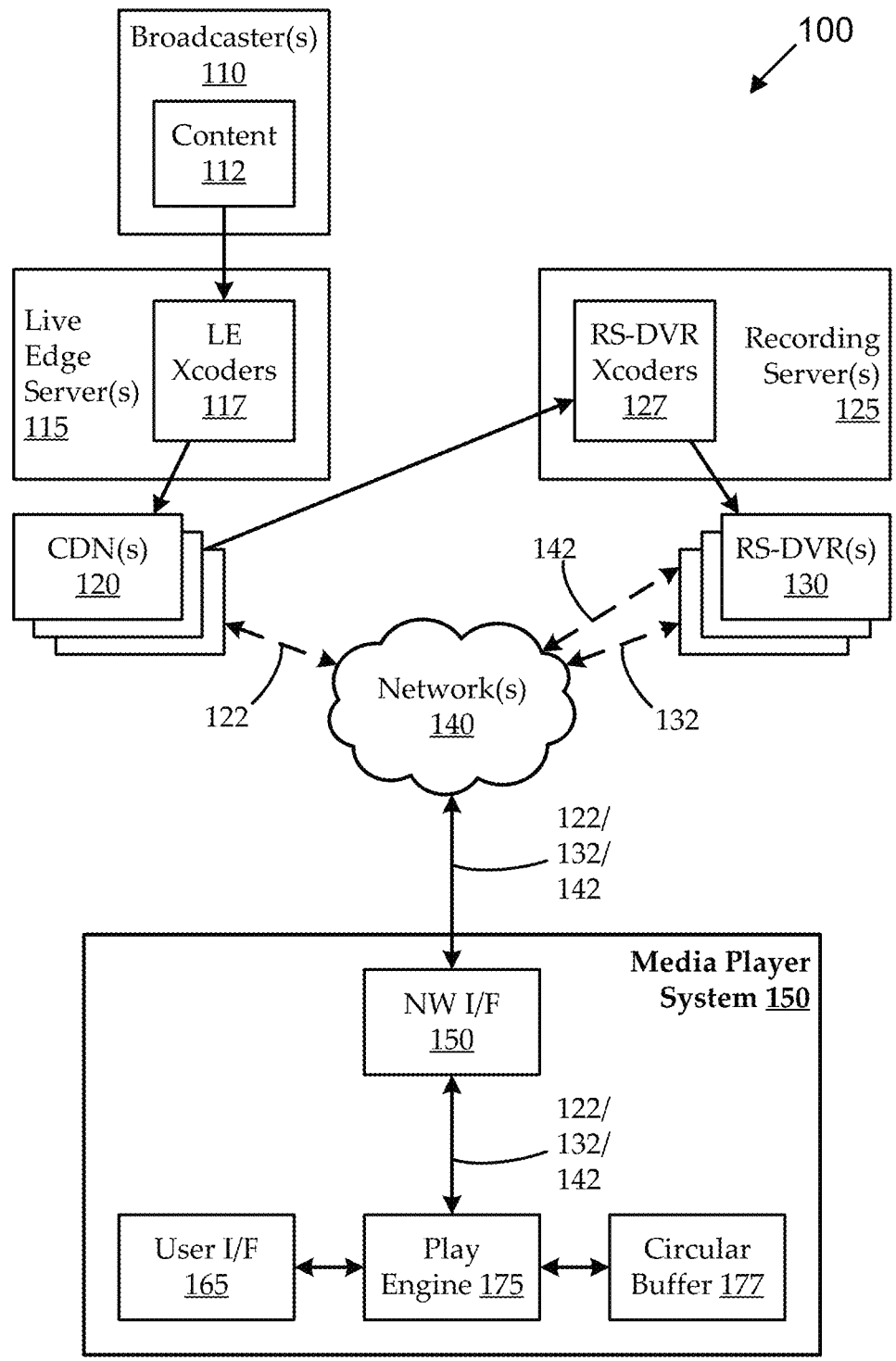
FIG. 1 shows an example of a conventional media playback environment for context.

FIG. 1 shows an example of a conventional media playback environment 100 for context. As illustrated, a conventional media player system 150 can access media content from multiple locations via one or more networks 140. In some cases, multiple types of content are available, and those types are defined at least in part by one or more protocols. For example, some digital video broadcast (DVB) protocols differentiate between "live" streams 122, "on-demand" streams 142, and "event" streams. Live streams 122 can represent streams for content that is being streamed in-time with its creation, such as a live broadcast of never-recorded content, a re-broadcast of or including previously recorded content, etc. For example, for a DVB live content stream 122, manifests for the stream are typically published as cached by one or more content delivery networks (CDNs) 120, and the media player system 150 can access the live stream 122 from a CDN 120 via the network(s) 140. Many network architectures use such CDNs 120, sometimes alternatively referred to as content distribution networks, to improve consumer quality of experience relating to online media consumption. CDNs 120 typically include servers that are strategically configured and located to improve content delivery to end consumers. For example, content sources can be distributed across many public and private networks with different geographies, access rates, link qualities, capabilities, etc. However, CDNs 120 can be located (e.g., at Internet exchange points) for efficient access to access networks 140, and the CDN 120 servers can be configured for fast, efficient, secure throughput, caching, load balancing, redundancy, media request handling, and/or other features. As such, it is typical in modern network architectures for requested media content to be moved from remote content sources (e.g., the broadcasters 110 or live edge servers 115) to CDNs 120, and for content streaming transactions to be handled via the CDNs 120, accordingly. The CDN 120 caches may be continually updated during streaming by removing past content segment identifiers from the manifests as new content segments are created and are made available. As such, the live content stream 122, as published, may only include a moving window of most-recent content segment identifiers. Because only the most recent segments may be available for streaming from the CDN 120, such live content streams 122 are typically intended to be watched only at their "live edge" (representing the last-broadcast segments of the content), and consumers typically cannot navigate such live content streams 122 by pausing, rewinding, or the like.

In contrast, on-demand content streams 142 can generally include any content that is pre-recorded to storage and is accessible to a consumer from that storage, such as on-demand movies, on-demand television program episodes, on-demand sporting events, etc. For example, for a DVB on-demand stream 142, manifests for the stream may include a complete set of segments for the entirety of the pre-recorded program, such that any portion of the program can be accessed. Because all segments are available for streaming, such on-demand streams 142 tend to be fully "navigable" (e.g., depending on capabilities of a playback environment), such that consumer interfaces may be available to permit pausing, rewinding, fast-forwarding, jumping, scanning, etc. In some cases, such on-demand streams 142 are accessible from local storage, such as from a local digital video recorder (DVR) integrated with, or in communication with, the media player system 150 (not shown). Some media content services providers offer access to such on-demand streams 142 via network-accessible (e.g., hosted, cloud-based, etc.) recording systems, such as remote storage DVRs (RS-DVRs) 130. For example, a media player system 150 can access on-demand streams 142 from RS-DVRs 130 via the network(s) 140.

Event-type streams are essentially a hybrid between live and on-demand stream types. Event streams can represent streams that include content being generated at the time of the streaming (e.g., similar to live streams 122), but for which backward-looking information is retained to support navigation (e.g., similar to on-demand streams 142). For example, such content can include a live broadcast of an event, to which a consumer may tune in during the event (or at the beginning of the event), and for which the consumer may desire to be able to pause, rewind, and/or otherwise navigate the content for the event. For example, for a DVB event stream, a manifest is continually updated during streaming by appending new content segment identifiers to the manifest as new content segments are created and are made available (e.g., via a CDN 120, or other location), but past content segment identifiers are not removed from the variant manifest. Typically, such an event stream is used to provide consumers with the ability to navigate live programming content. However, because the programming is still being published as it is being consumed, the programming at any moment is only available up to the live edge at that moment, and navigation is generally restricted to portions of the programming preceding the live edge (e.g., between the beginning of the program and some distance from the live edge, as described below). For example, such event streams can be made available to a media player system 150, via the network(s) 140, from CDNs 120, RS-DVRs 130, and/or other suitable network locations.

Embodiments described herein are generally concerned with live streams 122 and recorded-live streams 132. In some embodiments, recorded-live streams 132 are implemented as DVB event streams. For example, one or more broadcasters 110 broadcasts content 112 via one or more live edge servers 115. At the live edge servers 115, the content 112 can be transcoded by one or more live edge transcoders 117. As used herein, "transcoding" is intended to generally include any types of processing used to prepare the content streams and their segments, such as encoding into various bitrates and/or resolutions; applying digital rights management and/or other encryption; modifying metadata; etc. Similarly, as used herein, "decoding" (and "pre-decoding," as described below) are intended generally to include any processing to prepare stream content for playback, etc. in light of the types of transcoding that were applied to the content. For example, the content 112 can be transcoded into multiple versions (e.g., variants) for different resolutions, bitrates, audio and captioning support, etc.; and subsequently corresponding transcoded content can be decoded by reading metadata, decrypting, decoding, etc. There may be various pipelines between the live edge transcoders 117 and the one or more CDNs 120, such that caches at the CDNs 120 can be filled with segments of the different versions of the content 112 as the segments are generated by the live edge transcoders 117. As the transcoded segments are being published, they may be accessed by one or more recording servers 125. The recording servers 125 can operate to efficiently publish recorded-live stream 132 segments as versions of the live stream 122 segments. To publish the recorded-live stream 132, the recording servers 125 can further transcode the live stream 122 segments using RS-DVR transcoders 127, and can store the further transcoded segments and/or other data to the RS-DVRs 130.

As noted above, many network architectures use CDNs to optimize streaming and related transactions. As such, though not explicitly shown, the RS-DVRs 130 may be implemented with, or in communication with, CDNs; such that the on-demand streams 142 are also, or alternatively, available through CDNs. In some such cases, the CDNs used for access to recorded-live stream 132 (e.g., and/or on-demand stream 142) content of the RS-DVRs 130 are separate from those illustrated CDNs 120 used for live stream 122 content. For example, CDNs used to implement connectivity with RS-DVR 130 content can be under control of a content service provider with which the end consumer is associated (e.g., a consumer associated with the media player system 150 is a subscriber or customer of the content service provider), while the illustrated CDNs 120 can be under control of one or more third-parties (e.g., CDN service providers).

For example, the broadcasters 110 broadcast the live stream content 112 to the live edge servers 115. The content 112 is encoded into one or more container formats (e.g., HLS, or DASH, etc.) and fed to the CDNs 120. For example, various protocols have been developed to help maximize streaming media consumption experiences for end users within the resource limitations of networks. Some popular streaming media protocols are the HTTP Live Streaming (HLS) protocol developed by Apple Inc., and the Dynamic Adaptive Streaming over HTTP (DASH) protocol (or MPEG-DASH). These protocols generally seek to dynamically adapt the streaming media content in response to changes in network link conditions. Such adaptation can rely on one or more media coding (i.e., encoding and decoding) protocols, such as advanced video coding technologies developed by the International Telecommunications Union, the International Organization for Standardization/International Electrotechnical Commission Moving Picture Experts Group, and/or others (e.g., the so-called H.264, or MPEG-4 Part 10 Advanced Video Coding (AVC), codec; the H.265, or High Efficiency Video Coding (HEVC), codec; etc.). These media coding technologies can enable encoding of same audiovisual media content at different levels of compression, different bitrates, different numbers and/or types of layers, and/or the like. HLS, and/or other streaming protocols, can exploit these differently encoded versions of a same segment of media content to balance consumer experience against network resource consumption. For example, in response to detecting a degradation in link quality for a consumer while streaming media, the streaming protocol can automatically switch to a lower-quality-encoded version of the same media, which can be provided at a lower bitrate within the reduced link quality. As such, continuous streaming of the media to the consumer can be maintained even with the reduction in link quality, by reducing the need for network resources.

The content (segments) can effectively be published, after which a consumer may access the live stream 122 via the CDNs 120 using the media player system 150. For example, the media player system 150 includes a network interface 150, a user interface 165, a play engine 175, and a circular buffer 177. The consumer can select the live stream 122 content via the user interface 165, causing the play engine 175 to request the live stream 122 from a particular CDN 120 via the network interface 150. In accordance with that request, the media player system 150 can fetch the encoded streams from the CDNs 120 via the network interface 150 and use the play engine 175 to decode the streams locally. The decoded streams can then be output for playback to the consumer (e.g., to an integrated or communicatively coupled display via the user interface 165). The various encoding, decoding, etc. can take time (e.g., 25 seconds), such that even playback at the live edge of the decoded stream tends practically to be delayed relative to the live action (i.e., at the live edge of the broadcast stream as received at the live edge servers 115). In some embodiments, navigation of the live stream 122 is completely unavailable. In other embodiments, limited navigation of the live stream 122 is provided using the circular buffer 177 (or other local storage). For example, a "pause on live" service, or the like may allow live stream 122 playback to be paused for some amount of time and subsequently resumed using locally buffered content.

Providing the content via a recorded-live stream 132 can add appreciable delay. For example, the recording servers 125 can fetch the transcoded streams from the CDNs 120 (or directly from the live edge servers 115, in some implementations), can further transcode the streams using their RS-DVR transcoders 127, and can store the further transcoded segments and/or other data to the RS-DVRs 130 (e.g., and may host the RS-DVR 130 content via one or more internal CDN servers). A consumer may then access the recorded-live stream 132 via the RS-DVRs 130 using the media player system 150. For example, consumer can select the recorded-live stream 132 content via the user interface 165, causing the play engine 175 to request the recorded-live stream 132 from a particular RS-DVR 130 via the network interface 150. In accordance with that request, the media player system 150 can fetch the encoded streams from the RS-DVR 130 via the network interface 150 and use the play engine 175 to decode the streams locally. The decoded streams can then be output for playback to the consumer. The additional encoding, decoding, etc. can tend to add appreciable time on top of the typical live stream 122 delays, such that playback at the end of the decoded recorded-live stream 132 tends practically to be delayed (e.g., up to one minute) relative to the live edge of the live stream 122, which is already delayed relative to the live action. It has been observed in practice that, when attempting to playback recorded-live streams 132 at the live edge, media player systems 150 are often starved for video segment availability and can frequently experience stalls (e.g., "buffering wheels"), and/or the playback delay between the end of the recorded-live stream 132 and the live action is so large as to appreciably frustrate consumer quality-of-experience.

Still, it can be desirable for content service providers (e.g., satellite, cable, and/or other broadcast television service providers) to offer content via recorded-live stream 132. One reason, as described above, is that the recorded-live stream 132 adds navigability to the live programming, which can be highly desirable to consumers. Another reason it can be desirable to offer live content via a recorded-live stream 132 is additional availability of the content. Live stream 122 content tends to have very limited availability. For example, content of a typical live stream 122 is typically either only available for a limited duration as controlled by an associated broadcaster (e.g., of that channel), expires as the content is no longer within the moving segment window, expires immediately at the end of a scheduled time for the program, etc. In contrast, the content stored at the RS-DVRs 130 can be maintained indefinitely, for a duration controlled by the consumers (e.g., until it is deleted), for a duration controlled by the content service provider, etc. Another reason is that the recorded-live streams 132 can be more cost-effective to the content service providers. For example, in some implementations, the live edge servers 115 and CDNs 120 are under control of one or more broadcasters, and the recording servers 125 and RS-DVRs 130 (and additional internal CDNs) are under control of the content service provider, or the like. In some such implementations, a consumer associated with the media player system 150 is a customer (subscriber, etc.) of services of the content service provider; and it may cost the content service provider appreciably more to provide content to the customer via live stream 122 using the third-party infrastructure than to provide the content to the customer via recorded-live stream 132 using internal infrastructure.

In a conventional environment, such as the conventional media playback environment 100, consumers may be provided with a large set of options from which to select programming for playback. For example, the media player system 150 may output interactive electronic program guides (EPGs), search interfaces, etc. via the user interface 165. The consumer may then select to playback a particular program, and the particular program may be associated with one of a live stream 122, a recorded-live stream 132, or an on-demand stream 142. For example, the consumer may see a listing for an on-demand movie (which may be offered only via an on-demand stream 142), breaking news (which may be offered only via a live stream 122 without any navigation, or with very limited navigation), and a sporting event (which may be offered via a recorded-live stream 132 with full navigation control). As such, playback of the selected program involves using the media player system 150 to fetch the single stream associated with the selected program. When a consumer selects a program, conventionally, the consumer is also implicitly selecting a particular type of stream. Similarly, when live content is offered by the content service provider, there is conventionally a trade-off between offering the program via a live stream 122 or via a recorded-live stream 132.

Embodiments of the invention described herein include techniques for intelligently and transparently switching between the live stream 122 and the recorded-live stream 132 for requested live content. For example, live content is concurrently provided to a novel configuration of the media player system both via a live stream 122 from a live edge server 115 and via a recorded-live stream 132 from a recording server 125. During playback of live content by the novel media player system, the novel media player system uses a warm-up player to continually receive, pre-decode, and pre-buffer the live stream at the live edge to maintain a pre-buffered warm-up stream; and the novel media player system concurrently uses a primary player to decode and generate a playback stream for playback. In connection with watching the live content, the consumer can use navigation controls of the user interface 165 of the novel media player system to change the playback location (e.g., by pausing, rewinding, fast-forwarding, jumping to the live edge, etc.). When the user navigates playback between live-edge and non-live-edge locations, the novel media player system can seamlessly switch between generating the playback stream from the recorded-live stream (e.g., for non-live-edge playback), and generating the playback stream from the pre-buffered warm-up stream (e.g., for live-edge playback).

Figure 2:
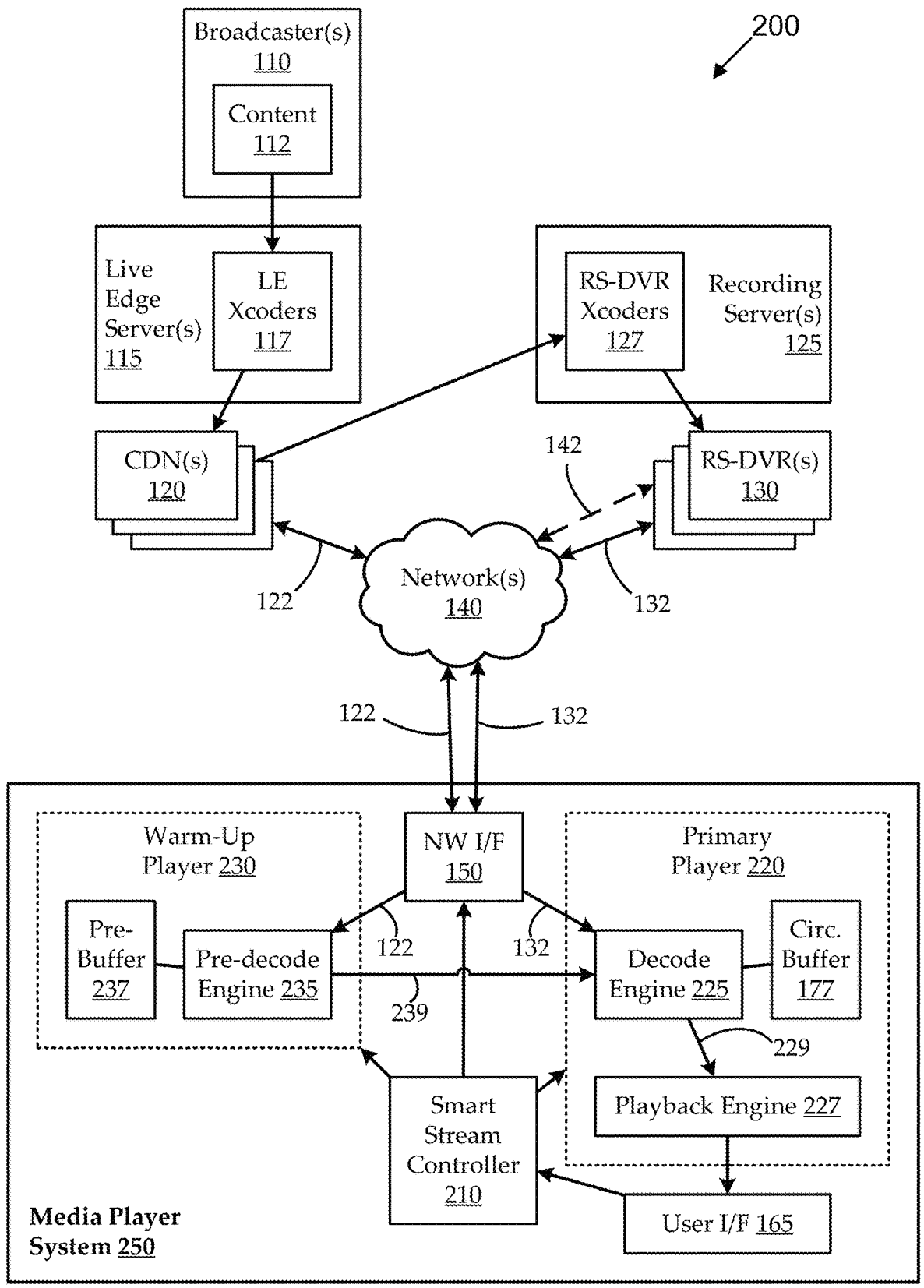
FIG. 2 shows a media playback environment that includes a novel media player system having both a primary media player and a warm-up media player, according to embodiments described herein.

FIG. 2 shows a media playback environment 200 that includes a novel media player system 200 having both a primary media player 220 and a warm-up media player 230, according to embodiments described herein. For added clarity, the provider(s) side of the environment 200 is shown in the same way as illustrated in FIG. 1. For example, the broadcasters 110, live edge servers 115, CDNs 120, recording servers 125, RS-DVRs 130, and network(s) 140 may operate in much the same way as described above, and are labeled with corresponding reference designators, accordingly. As illustrated, the novel media player system 250 includes a primary media player 220, a warm-up media player 230, and a smart stream controller 210.

The media player system 250 can be implemented by any suitable computational environment, such as any suitable consumer premises-type of device, such as a network-connected television, set-top box, desktop computer, smart home appliance, etc.; and/or any suitable consumer mobile-type of device, such as a smartphone, laptop or tablet computer, wearable device, e-reader, portable media player, etc. The media player system 250 includes a user interface 165, which can generally include any components suitable for facilitating use input and user output. Embodiments of the user interface 165 can include (or be configured to interface with) input components, such as physical or virtual buttons, touchscreen displays, keypads, remote control devices, etc.; and output components, such as displays, indicators, etc. In one implementation, the media player system 250 is implemented on a smartphone or tablet computer, and the user interface 165 includes a touchscreen display by which the user can provide input to graphical user interfaces displayed on the touchscreen display, and can watch program content played back via the display. In another implementation, the media player system 250 is implemented by a set-top box, the user interface 165 includes a remote control device in wireless communication with the set-top box by which to receive user input commands, and the user interface 165 includes one or more ports or other components by which to output playback program content to a television or other display.

The media player system 250 can also include a network interface 150. The network interface 150 includes any suitable components to facilitate network connectivity and communications via the network(s) 140 for the media player system 250. For example, the network interface 150 can include antennas, physical and/or logical ports, communication chipsets, amplifiers, filters, etc. The network(s) 140 may be any type of wired or wireless network, or combination thereof. Merely by way of example, the network(s) 140 may include a satellite network, a cable network, a wireline network, an optical fiber network, a telecommunications network, an intranet, an Internet, a local area network (LAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network(s) 140 may include one or more network access points, such as wired or wireless network access points (e.g., base stations and/or internet exchange points). The network interface 150 operates to facilitate concurrent connectivity between the media player system 250 and both the CDNs 120 (e.g., third-party CDNs associated with the broadcasters, the live edge servers 115, etc.) and the RS-DVRs 130 (e.g., associated with the content service provider, which may also be implemented via CDNs of the content service provider).

Embodiments of the warm-up media player 230 couple with the live edge servers 115 via the network(s) 140 to obtain a live stream 122. The live stream 122 includes live programming content in accordance with a user interaction command indicating a request for the live programming content. For example, a consumer presently or previously interacts with the user interface 165 (e.g., via an electronic program guide, search interface, channel selection, etc.) to indicate a request for particular live content, and the request results in a request to fetch the live stream 122 from a particular CDN 120. The warm-up media player 230 includes a pre-decode engine 235 and a pre-buffer 237. The pre-decode engine 235 can perform any processes to prepare fetched live stream 122 content for playback. For example, the "pre-decoding" by the pre-decode engine 235 can generally include decoding segments, implementing any applicable digital rights management and/or other decryption, etc. The pre-decoding can effectively generate a warm-up stream 239, which can be a pre-decoded version of the live stream 122. Embodiments of the warm-up media player 230 can use the pre-buffer 237 to maintain some amount of the generated warm-up stream 239. For example, the warm-up stream 239 typically represents some window of content of the live stream 122 up to the live edge.

As noted above, streaming protocols (e.g., HLS, DASH, etc.) provide for adaptive encoding, such that multiple versions of live stream 122 content are typically published for different resolutions, bitrates, etc. It is generally desirable to maximize the output bitrate when playing back a content stream based, for example, on the maximum resolution of the output display, based on current network conditions (e.g., available bandwidth), etc. In some embodiments, the warm-up media player 230 uses a warm-up bitrate, instead of seeking to maximize the bitrate. For example, as described herein, embodiments of the media player system 250 can switch between generating playback based on the live stream 122 and based on a corresponding recorded-live stream 132. Embodiments may optimize the bitrate of the fetched live stream 122 while playback is being generated from the live stream 122, and may use the warm-up bitrate for the live stream 122 while playback is being generated from the recorded-live stream 132. In one implementation, the warm-up bitrate is preset to a particular bitrate associated with a version (e.g., variant) known to be available via the CDNs 120, and the pre-decode engine 235 fetches and decodes the version of the live stream 122 associated with the preset warm-up bitrate. In another implementation, the warm-up bitrate is an average (e.g., nearest to average) bitrate of the available versions of the live stream 122, and the pre-decode engine 235 fetches and decodes the version of the live stream 122 associated with the average warm-up bitrate. In another implementation, the warm-up bitrate is selected based on a smallest resolution needed to fit the output display, and the pre-decode engine 235 fetches and decodes the version of the live stream 122 associated with the determined warm-up bitrate.

Embodiments of the primary media player 220 couple with the remote recording servers 125 via the network(s) 140 to obtain recorded-live streams 132 corresponding to the live streams 122 in accordance with the user interaction command and concurrent with the warm-up media player 230 generating the warm-up stream 239. As illustrated, the primary media player 220 includes a decode engine 225, a circular buffer 177, and a playback engine 227. In general, the primary media player 220 can operate similar to the warm-up media player 230, except that the primary media player 220 is configured to generate a payback stream for output to a display, while the warm-up media player 230 is configured only to generate a warm-up stream 239. For example, some embodiments of the decode engine 225 operate similarly to the pre-decode engine 235 of the warm-up media player 230; the decode engine 225 operates to perform any suitable decoding, decrypting, and/or other processes to support playback of stream content. To that end, embodiments of the decode engine 225 can be configured to generate an output stream as a playback stream 229. For example, even while embodiments of the pre-decode engine 235 are generating and pre-buffering the warm-up stream 239 based on a warm-up bitrate, the decode engine 225 can operate to maximize (or otherwise optimize) the bitrate of its fetched stream for playback. Embodiments of the playback engine 227 output the playback stream 229 in a manner that can be used as an input for a display. For example, the playback engine 227 can perform rendering, or other processes.

As described herein, the primary media player 220 can generate the playback stream 229 based on user navigation interactions. In response to certain types of navigation interactions (e.g., resulting in non-live-edge playback), the primary media player 220 can generate the playback stream 229 from a received recorded-live stream 132. For example, the decode engine 225 fetches a recorded-live stream 132 from an appropriate RS-DVR 130 via the network(s) 140, and decodes and decrypts the stream to generate the playback stream 229. In response to other types of navigation interactions (e.g., resulting in live-edge playback), the primary media player 220 can generate the playback stream 229 from the warm-up stream 239. For example, the decode engine 225 fetches the warm-up stream 239 from the pre-buffer 237 of the warm-up media player 230, uses the warm-up stream 239 to generate the playback stream 229.

The manner of switching between generation of playback based on the live streams 122 and generation of playback based on the recorded-live streams 132 can be controlled by the smart stream controller 210. Embodiments of the smart stream controller 210 direct the primary media player 220 to output the playback stream 229 based on a present playback state of multiple possible playback states associated with the live content being watched. When the present playback state is any of a first subset of the plurality of playback states (e.g., corresponding to non-live-edge playback) the smart stream controller 210 can direct the primary media player 220 to generate and output the playback stream 229 by decoding and outputting a recorded-live stream 132 as the playback stream 229. When the present playback state is any of a second subset of the plurality of playback states (e.g., corresponding to live-edge playback) the smart stream controller 210 can direct the primary media player 220 to generate and output the playback stream 229 by decoding and outputting a warm-up stream 239 as the playback stream 229. In general, the playback state is user-navigable during outputting of the playback stream 229. For example, the user interface 165 permits a consumer to navigate the content while it is being watched, thereby changing the playback state. For example, the playback states can include play from start, jump to live edge, seek, fast forward, rewind, pause, resume after pause, skip forward or backward by some amount of time, jump to a bookmark or index, etc.

Further, while embodiments are described using certain stream terminology, embodiments described herein can be applied in any suitably similar technical environments. For example, while DVB-based terminology is generally used here for stream and related concepts, embodiments can operate in context of quantum virtual timelines (QVTs). A QVT is a backend data structure that includes instructions for playback of media segments. QVT files can include a list of clips, and each clip refers to a piece of content. For each clip, the QVT can reference all of the content, or just a portion. The portion can be specified down to the frame level. The QVT file may contain metadata that can be displayed to the user, such as titles or descriptions, and can be used by client side application logic to trigger ads and/or facilitate other features. For example, what are referred to herein as live streams, recorded-live streams, and on-demand streams, may be referred to as "live QVT," "live-DVR QVT," and "DVR QVT," respectively. Similarly, while the term RS-DVRs is used herein to reference remotely hosted DVR features, some content service providers may refer to such features as an "over-the-top" (OTT) DVR service, or in other ways.

For example, an OTT DVR service is managed completely by a backend service of a content service provider (e.g., as opposed to services managed locally by the consumer devices). With such a service, users may be able to schedule recordings for their favorite content (e.g., by program, for all episodes, etc.). When content scheduled for recording is aired live, the OTT DVR service can start downloading the live content on in-house DVR servers (RS-DVRs). Once the DVR content is available on the RS-DVRs, users can watch the recordings anytime. The OTT DVR service can also allow the playback of a recording while the recording of a live aired content is still in progress, thereby yielding the live-DVR QVTs. For example, a user can watch live content using live QVTs. The live QVTs are served by external CDN servers and typically expire based on the airing times defined by the broadcasters. Some may be "timeshiftable" live channels, which allow users to seek up to the live edge (e.g., and to pause and resume the live content at any time, even without the OTT DVR features); and others may be "non-timeshiftable" channels, which do not allow users to perform any action (e.g., they are restricted to watch only the live-edge content). Alternatively, users can watch on-demand types of content via the DVR QVTs, which may be stored on the RS-DVRs. Such content typically does not expire (e.g., unless the user deletes the recorded content, or the provider decides to stop providing it, etc.), and the content is typically fully navigable. As described above with reference to recorded-live streams, the live-DVR QVT content is typically served by in-house servers (e.g., internal CDNs) and permit viewing both at live-edge and non-live-edge playback locations. For example, users are restricted to seek up to (or near) the current live edge, which continually increments (e.g., every second). Live-DVR QVTs can be used with any timeshiftable or non-timeshiftable channels.

Figure 3A:
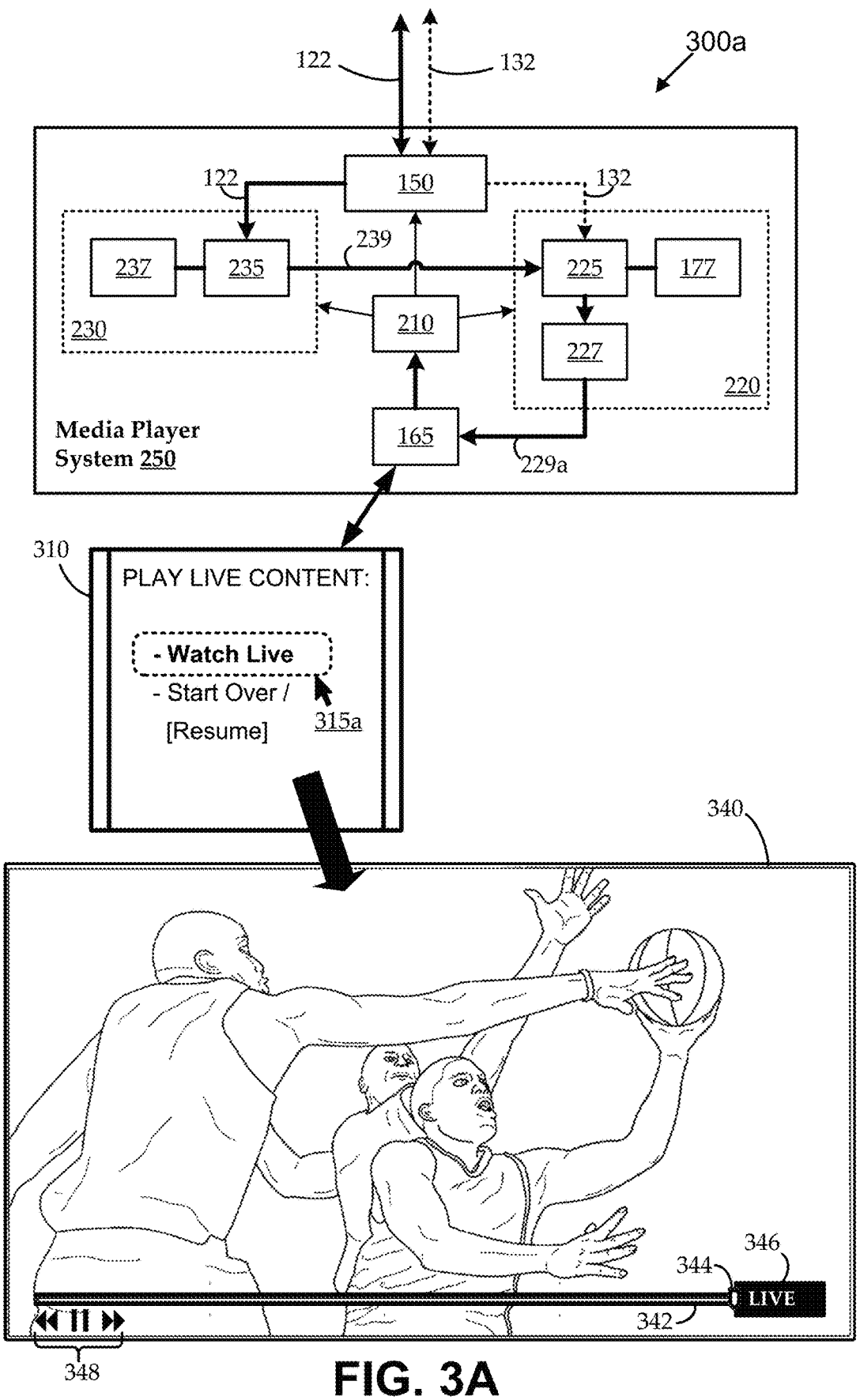
FIGS. 3A and 3B illustrate interaction between an illustrative user interface elements and interactions and implementations of the media player system, according to various embodiments.
Figure 3B:
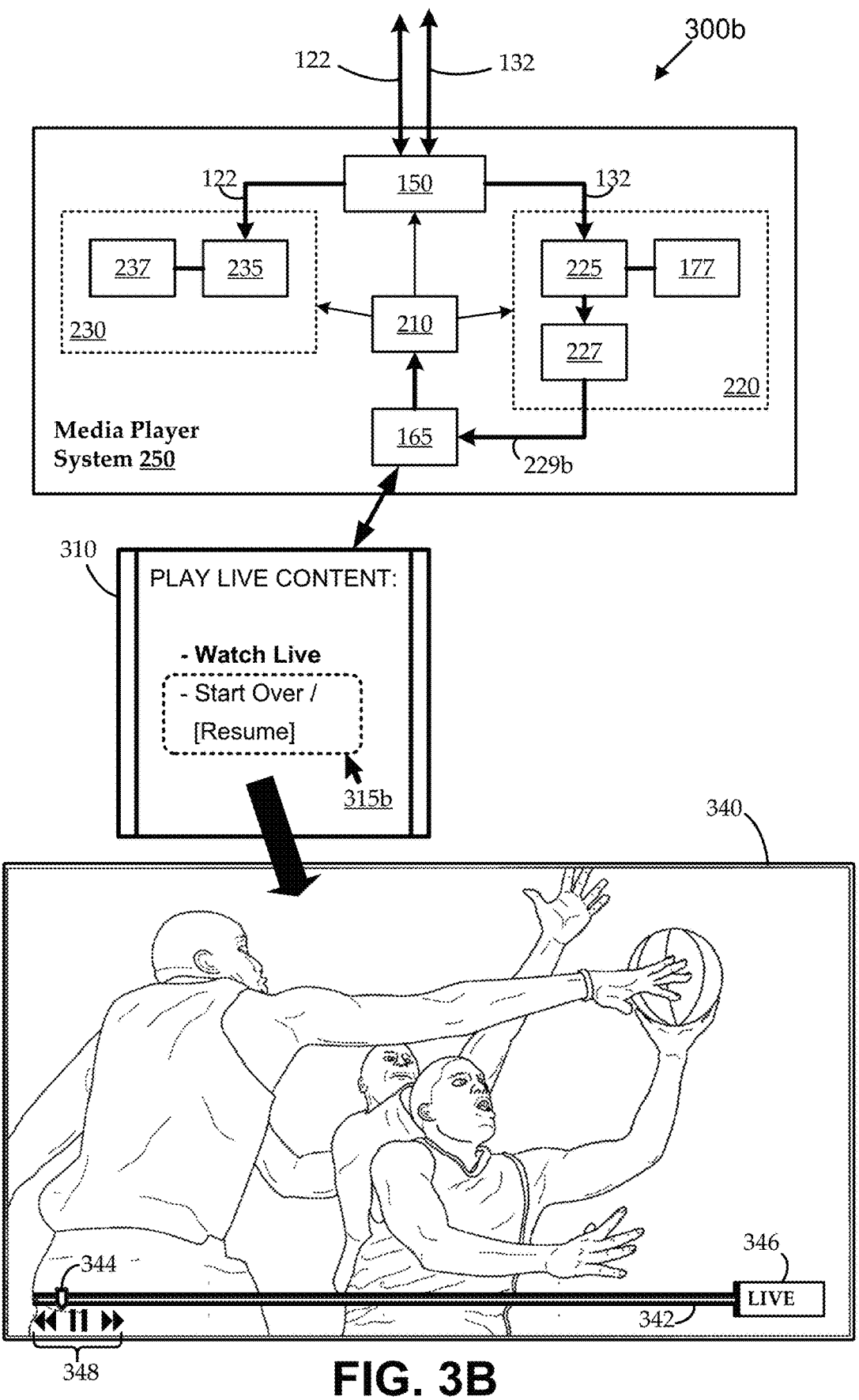

FIGS. 3A and 3B illustrate interaction between an illustrative user interface elements and interactions and implementations of the media player system 250, according to various embodiments. The media player system 250 of FIG. 2 is shown in both FIGS. 3A and 3B in context of multiple illustrative interactive display outputs, which can be implemented by (or in connection with) the user interface 165. As illustrated, a first interactive display output 310 includes a menu of selectable navigation options. The first interactive display output 310 may represent a navigation menu accessible via a primary display, a pop-up window appearing on a primary display, a menu displayed on a remote control device or other interface device, etc. FIG. 3A represents selection of a "Watch Live" option, and FIG. 3B represents selection of a non-live option (e.g., "Start Over," or "Resume" from playback previously having been paused). The different results of the selections are shown as impacting generation of the playback stream 229, and the corresponding output to a primary display 340. The depicted scene is not intended to be representative of any particular features. For example, depiction is of a same scene from a basketball game, even though the display 340 in FIG. 3A represents playback at the live edge, while the display 340 in FIG. 3A represents playback at some non-live edge playback location.

Turning to FIG. 3A, the "Watch Live" option has been selected. In response, the smart stream controller 210 directs the primary media player 220 to generate the playback stream 229 based on the warm-up stream 239. As such, the playback stream 229 is effectively being generated based on a pre-decoded and pre-buffered version of the live stream 122, thereby permitting playback at a live edge relatively close to the present live action. Darker signal lines generally indicate active signal paths, while lighter dashed signal lines generally indicate inactive signal paths. As illustrated, the live stream 122 is being fetched by the warm-up media player 230 via the network interface 150 (e.g., from a third-party CDN), and is being used to generate the warm-up stream 239. The warm-up stream 239 is being fetched by the primary media player 220 and used to generate and output a playback stream (indicated as a first playback stream 229a).

Turning to FIG. 3B, the "Start Over" option has been selected. In response, the smart stream controller 210 directs the primary media player 220 to generate the playback stream 229 based on the recorded-live stream 132. As such, the playback stream 229 is effectively being generated based on segments of the live stream 122 that were pre-recorded by a RS-DVR 130. Because the playback location is nowhere near the live edge, any delay between the end of the recorded-live stream 132 and the live edge will not impact playback for the consumer, and the player has access to plenty of forward-looking segments (i.e., there is no danger of starving the player for segments at the live edge). As illustrated by the darker signal lines and the lighter dashed signal lines, the recorded-live stream 132 is being fetched by the primary media player 220 via the network interface 150 (e.g., from a RS-DVR 130) and is being used to generate the playback stream (indicated as a second playback stream 229b to differentiate from the first playback stream 229a generated from the live stream 122 content). Notably, as illustrated, embodiments can continue to fetch, pre-decode, and pre-buffer the live stream 122 even while playback is being generated from the recorded-live stream 132.

For added context, various illustrative user interface controls are shown, some or all of which being implemented by, or in connection with, the user interface 165. For example, a duration bar 342 and slider 344 can be provided to indicate a present playback position. In some implementations, the user interface 165 permits dragging of the slider 344 to change the playback position. As another example, a "LIVE" indicator 346 is shown. In some implementation, the live indicator 346 indicates whether the content is presently being played back at the live edge (e.g., by changing color or other appearance, or in any other suitable manner). In some implementations, clicking on the live indicator 346 causes playback to jump to the live edge. As another example, various other navigation controls can be provided, such as rewind, fast-forward, pause, etc. Any other navigation controls can be provided. For example, the user interface 165 can provide one or more menus, etc.

Figure 4:
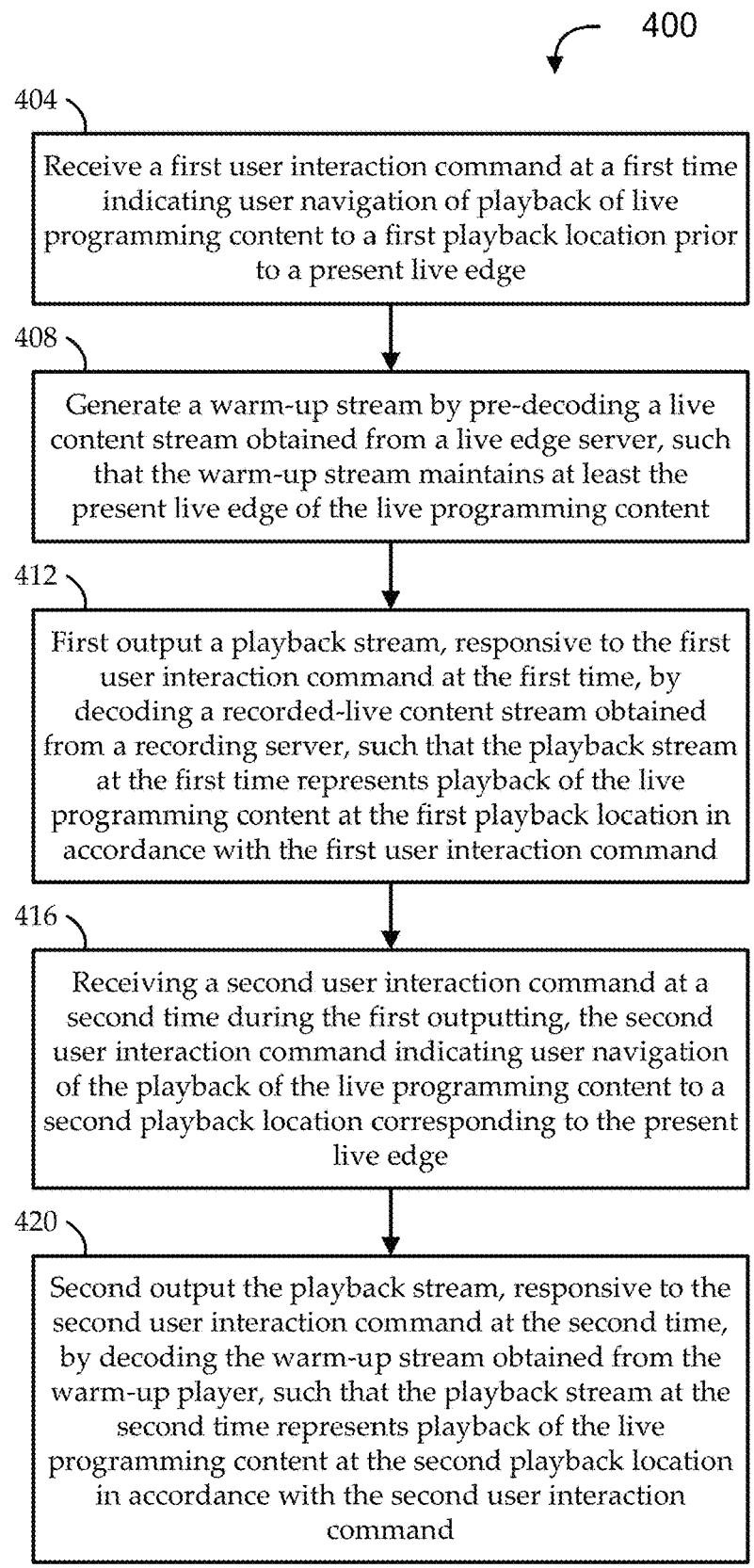
FIG. 4 shows a flow diagram of an illustrative method for media playback, according to various embodiments.

The systems and components described above can be used to provide a number of different types of features to support a number of different use cases, including performing various methods and processes described herein. FIG. 4 shows a flow diagram of an illustrative method 400 for media playback, according to various embodiments. Embodiments of the method 400 begin at stage 404 by receiving a first user interaction command at a first time indicating user navigation of playback of live programming content to a first playback location prior to a present live edge. For example, the user interaction command corresponds to an initial request to watch live content from a non-live-edge playback location, such as from the beginning of the program. As another example, the user interaction command corresponds to a request, during playback of the live content, to navigate to some non-live-edge playback location.

In some embodiments, receiving the first user interaction command at the first time at stage 404 includes: receiving a user request, via a user interface, to initiate playback of the live programming content, and prompting the user (via the user interface), responsive to the user request, to select between various options. For example, the options can include: initiating playback of the live programming content in the present live edge of the live programming content; initiating playback of the live programming content at the first playback location; etc. For example, the first user interaction command corresponds to selection by the user, responsive to the prompting, of initiating playback of the live programming content at the first playback location.

At stage 408, embodiments can generate a warm-up stream by pre-decoding (e.g., using a warm-up media player) a live content stream obtained from a live edge server as published via a provider communication network, such that the warm-up stream maintains at least the present live edge of the live programming content. In some embodiments, the generating at stage 408 includes continually updating pre-buffering of the pre-decoded live content stream to maintains at least the present live edge of the live programming content. At stage 412, embodiments first output a playback stream (e.g., by a primary media player), responsive to the first user interaction command at the first time, by decoding a recorded-live content stream. The recorded-live content stream can be obtained from a recording server via the provider communication network and generated at the remote recording server from the live content stream as the live content stream is being published by the live edge server, such that the playback stream at the first time represents playback of the live programming content at the first playback location in accordance with the first user interaction command.

In some embodiments, the first user interaction command is a seek back command received at the first time during playback of the live programming content at the present live edge according to using the primary media player to generate the playback stream from the warm-up stream obtained from the warm-up player. For example, during live-edge playback, the consumer drags a slider, jumps back to a particular non-live-edge location, rewinds, etc. In some such embodiments, the first outputting at stage 412 can be responsive to the first user interaction command to include: issuing a player request, by the primary media player to the recording server, for the recorded-live content stream at the first playback location; and decoding the recorded-live content stream as obtained from the remote recording server responsive to the player request.

Some embodiments further receive a pause command as a third user interaction command at a third time prior to the first time, the pause command received during playback of the live programming content at the present live edge according to using the primary media player to generate the playback stream from the warm-up stream obtained from the warm-up player. Such embodiments can pause the playback of the live programming content, responsive to the pause command, at a resume playback location defined by the present live edge at the third time, wherein the first user interaction command is a resume-after-pause command. In such embodiments, the first outputting at stage 412 can include: issuing a player request, by the primary media player to the recording server, for the recorded-live content stream at the resume playback location; and decoding the recorded-live content stream as obtained from the remote recording server responsive to the player request.

In some such embodiments, the primary player includes a circular buffer to maintain a buffered window of the playback stream having a window duration. The first outputting at stage 412 can further include determining whether a difference between the first time and the third time is greater than the window duration, and resuming the playback at the resume playback location from the circular buffer responsive to determining that the difference between the first time and the third time is not greater than the window duration; and the first outputting at stage 412 can include the issuing the player request, and the decoding the recorded-live content stream as obtained from the remote recording server responsive to the player request, responsive to determining that the difference between the first time and the third time is greater than the window duration.

Some embodiments can further include receiving a pause command as a third user interaction command at a third time prior to the first time, the pause command received during playback of the live programming content at the present live edge according to using the primary media player to generate the playback stream from the warm-up stream obtained from the warm-up player. Such embodiments can pause the playback of the live programming content, responsive to the pause command, at a resume playback location defined by the present live edge at the third time; and such embodiments can generate the warm-up stream, responsive to the pause command, between the third time and the first time, by using the warm-up media player to pre-decode the recorded-live content stream obtained from the recording server as published via a provider communication network, such that the warm-up stream maintains a resume playback window defined according to the resume playback location. In such embodiments, the first user interaction command can be a resume-after-pause command, and the first outputting at stage 412 can include decoding the warm-up stream obtained from the warm-up player, such that the playback stream at the first time represents playback of the live programming content at the resume playback location in accordance with the first user interaction command.

At stage 416, embodiments can receive a second user interaction command at a second time during the first outputting. The second user interaction command indicates user navigation of the playback of the live programming content to a second playback location corresponding to the present live edge. For example, during playback of the content at the non-live-edge playback location, the consumer scrolls, fast-forward, or jumps to the live edge. At stage 420, embodiments can second output the playback stream (e.g., by the primary media player), responsive to the second user interaction command at the second time, by decoding the warm-up stream obtained from the warm-up player, such that the playback stream at the second time represents playback of the live programming content at the second playback location in accordance with the second user interaction command.

Figure 5:
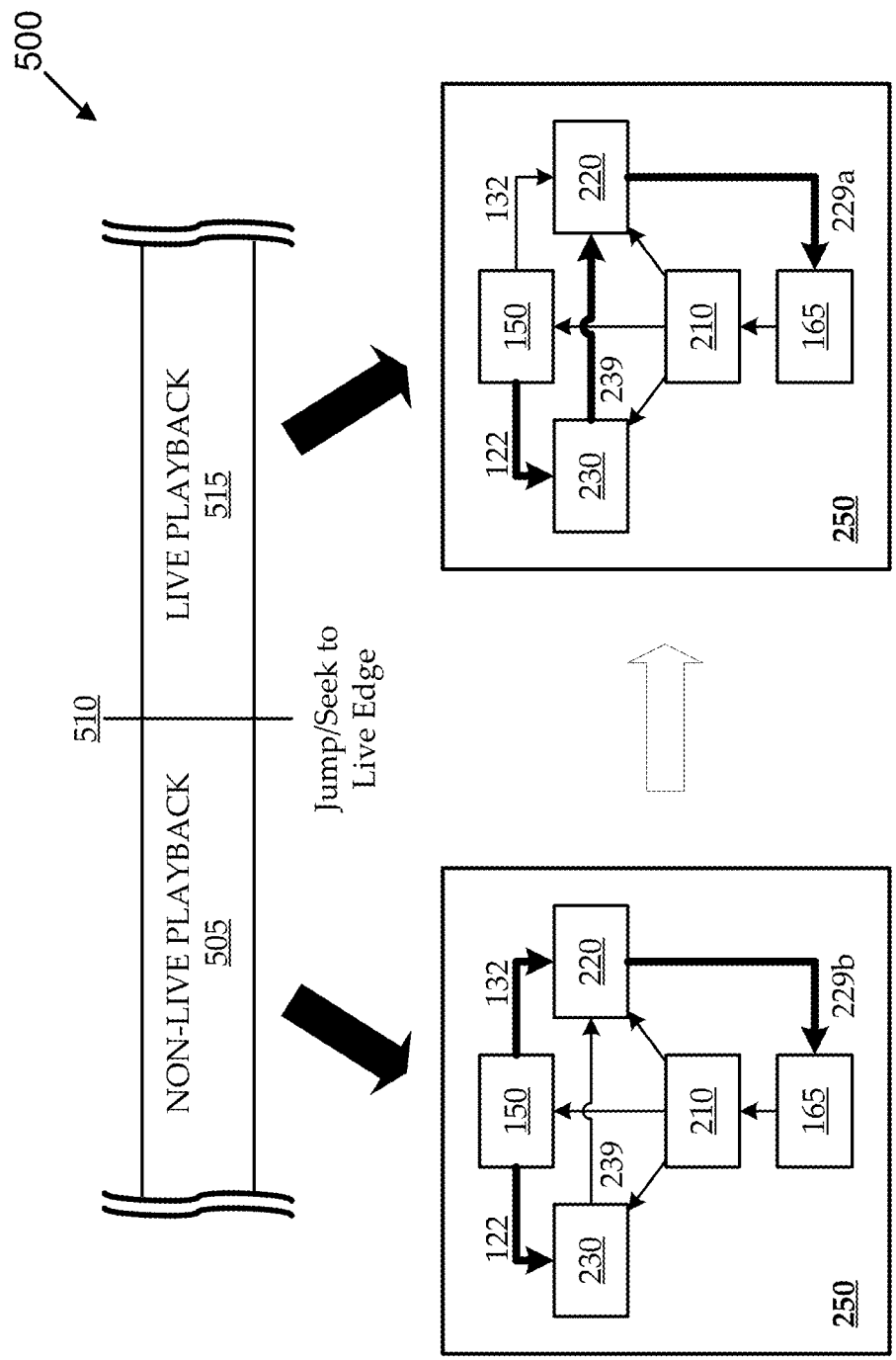
FIG. 5 shows a first example use case in which a consumer switches quickly from non-live-edge playback to live-edge playback, according to various embodiments.

Selected use cases are further illustrated by FIGS. 5-8. FIG. 5 shows a first example use case in which a consumer switches quickly from non-live-edge playback to live-edge playback, according to various embodiments. As illustrated, non-live-edge playback is occurring during a first timeframe 505. As illustrated by the simplified media player system 250 on the left, using darkened arrows for active stream paths, the media player system 250 concurrently receives both the live stream 122 and the recorded-live stream 132. The live stream 122 is pre-decoded and pre-buffered by the warm-up media player 230 to generate a warm-up stream 239, but the warm-up stream 239 is not being used by the primary media player 220. Instead, the primary media player 220 is generating and outputting a playback stream 229b based on the recorded-live stream 132.

At some point in time 510, during the non-live-edge playback, a navigation interaction occurs to switch to live-edge playback. For example, the consumer interacts with one or more controls of the user interface 165 to jump to the live edge, fast-forward to the live edge, drag a slider to the live edge, etc. From that point in time 510 forward, live-edge playback commences in timeframe 515. As illustrated by the simplified media player system 250 on the right, the media player system 250 continues concurrently to receive both the live stream 122 and the recorded-live stream 132. Now, however, warm-up stream 239 generated at the warm-up media player 230 by pre-decoding the live stream 122 is used by the primary media player 220 to generate and output the playback stream 229a. Practically, time 510 can have non-zero duration. However, as described herein, use of the warm-up media player 230 to pre-decode and pre buffer the live stream 122 as a warm-up stream 239 can make the transition from non-live-edge playback to live-edge playback appear to be effectively seamless.

Figure 6:
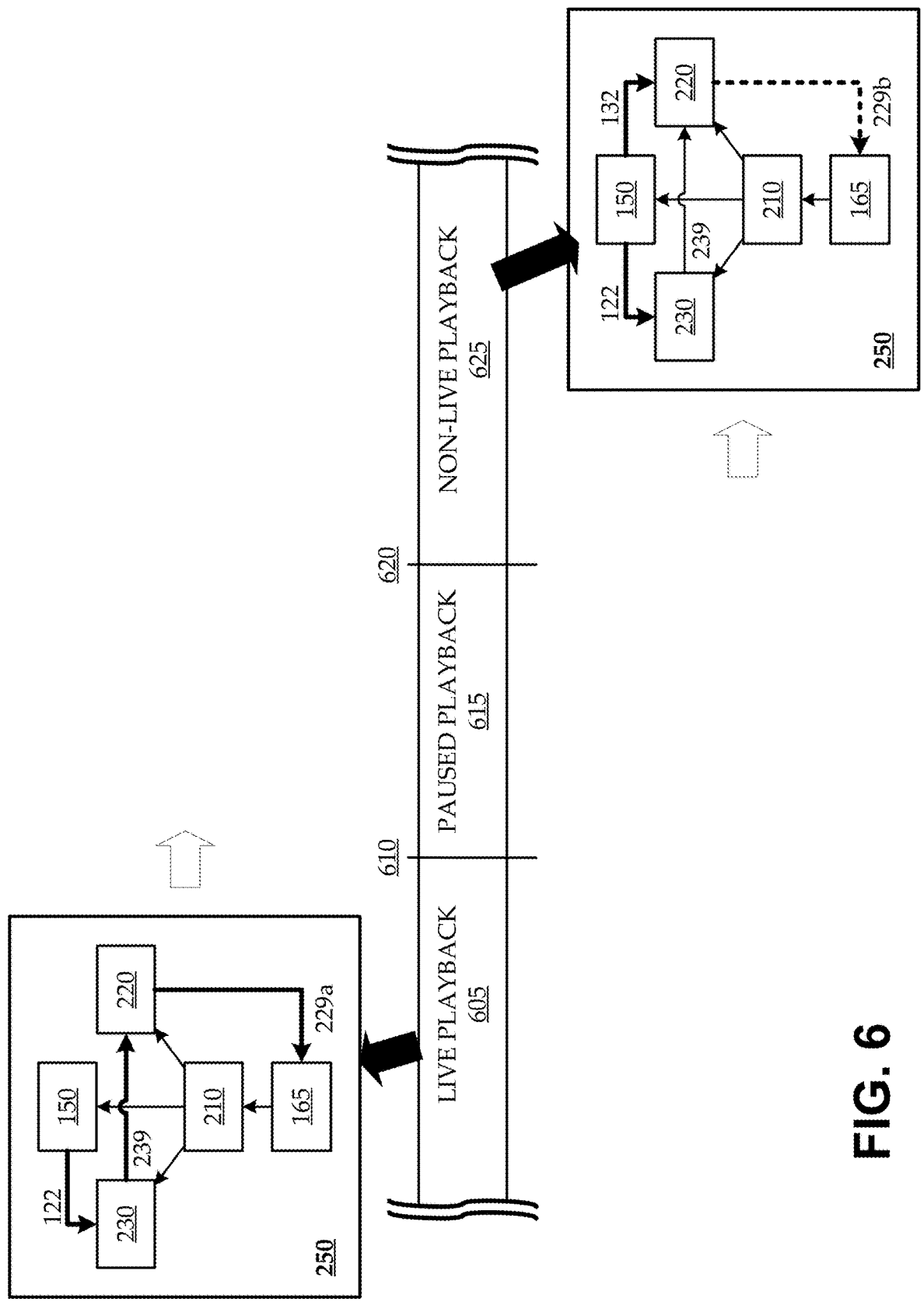
FIG. 6 shows an example of a second case in which a consumer pauses live-edge playback and subsequently resumes playback, now no longer at the live edge, according to various embodiments.

FIG. 6 shows an example of a second case in which a consumer pauses live-edge playback and subsequently resumes playback, now no longer at the live edge, according to various embodiments. As illustrated, live-edge playback is occurring during a first timeframe 605. As illustrated by the simplified media player system 250 on the top-left, using darkened arrows for active stream paths, the media player system 250 receives the live stream 122. In particular, the warm-up media player 230 pre-decodes and pre-buffers the live stream 122 to generate a warm-up stream 239, which is used by the primary media player 220 to generate and output a playback stream 229a. At some point in time 610, during the live-edge playback, a navigation interaction occurs to pause the playback. During pausing of the playback over timeframe 615, a playback resume location can be maintained (e.g., by the smart stream controller 210, or any other suitable component). At some subsequent time 620, playback is resumed. From that point in time 620 forward, non-live-edge playback commences in timeframe 625 from the resume playback location. As illustrated by the simplified media player system 250 on the bottom-right, the media player system 250 continues to receive and pre-decode the live stream 122, but now also received and decodes the recorded-live stream 132 at the resume playback location. The primary media player 220 generates and outputs the playback stream 229b based on the recorded-live stream 132 in timeframe 625.

Figure 7:
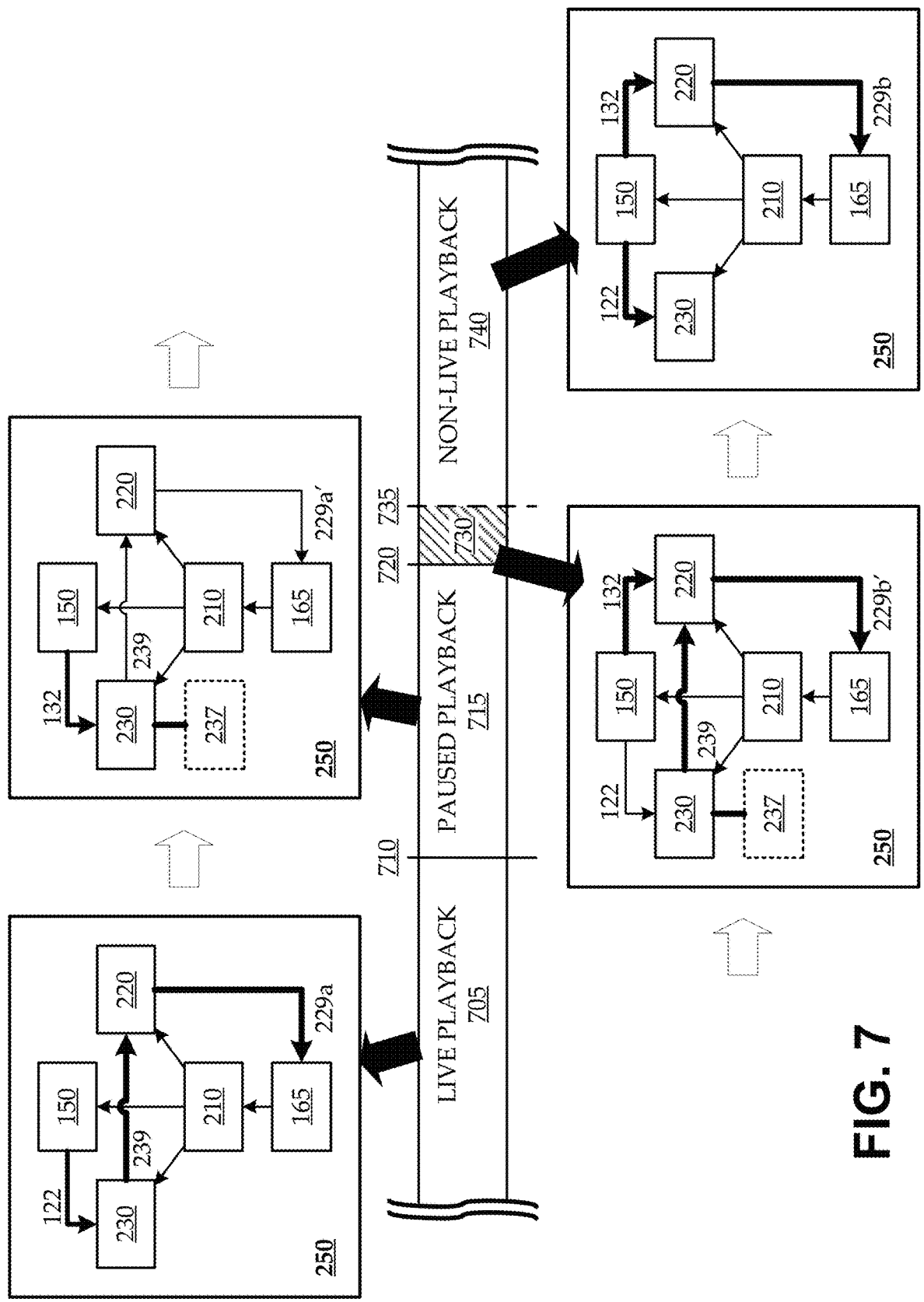
FIG. 7 shows an example of a third case in which a consumer pauses live-edge playback and subsequently resumes playback, now no longer at the live edge, according to various embodiments.

FIG. 7 shows an example of a third case in which a consumer pauses live-edge playback and subsequently resumes playback, now no longer at the live edge, according to various embodiments. As in FIG. 6, live-edge playback is occurring during a first timeframe 705. As illustrated by the simplified media player system 250 on the top-left, using darkened arrows for active stream paths, the media player system 250 receives the live stream 122. In particular, the warm-up media player 230 pre-decodes and pre-buffers the live stream 122 to generate a warm-up stream 239, which is used by the primary media player 220 to generate and output a playback stream 229a. At some point in time 710, during the live-edge playback, a navigation interaction occurs to pause the playback.

Unlike in FIG. 6, in addition to maintaining the playback resume location, embodiments can begin to use the warm-up media player 230 to pre-decode and pre-buffer segments of the recorded-live stream 132 during a paused timeframe 715 (e.g., using pre-buffer 237), such that a warm-up stream 239 is available with stream segments around the resume playback location. As illustrated by the simplified media player system 250 on the top-right, the media player system 250 receives the recorded-live stream 132, and the warm-up media player 230 pre-decodes and pre-buffers the recorded-live stream 132 to generate a warm-up stream 239. However, the warm-up stream 239 is pre-buffered and not used to generate or output any playback stream 229. For example, the playback stream 229a' during timeframe 715 may depict a paused frame of the display output, a screen saver, or any other output. In some embodiments, a second warm-up media player 230 is instantiated and used to generate the warm-up stream 239 based on the recorded-live stream 132, while the first warm-up media player 230 continues to generate a separate warm-up stream 239 from the live stream 122. For example, this can address a case where a consumer goes from paused playback directly to live-edge playback.

At some subsequent time 720, playback is resumed. Initially, playback can be handled using the warm-up stream 239 generated from the recorded-live stream 132 segments around the resume playback location. For example, during some timeframe 730, non-live-edge playback commences based on the pre-buffered warm-up stream 239 content. As illustrated by the simplified media player system 250 on the bottom-left, the media player system 250 can begin to transition back to using the warm-up media player 230 to receive the live stream 122 while concurrently using the primary media player 220 to receive the recorded-live stream 132, Meanwhile, the primary media player 220 fetches the warm-up stream 239 from the pre-buffer 237 of the warm-up media player 230, and generates and outputs the playback stream 229b based on that data until it can resume fetching of segments from the recorded-live stream 132. For example, after some amount of time, a transition time 735 occurs, after which non-live-edge playback continues in timeframe 740, now based on newly received (not pre-decoded) recorded-live stream 132 data. In some embodiments, the playback after the resume can attempt to catch back up to the live edge, where practical, such that playback in timeframe 740 (or at some subsequent timeframe) returns to live-edge playback.

Figure 8:
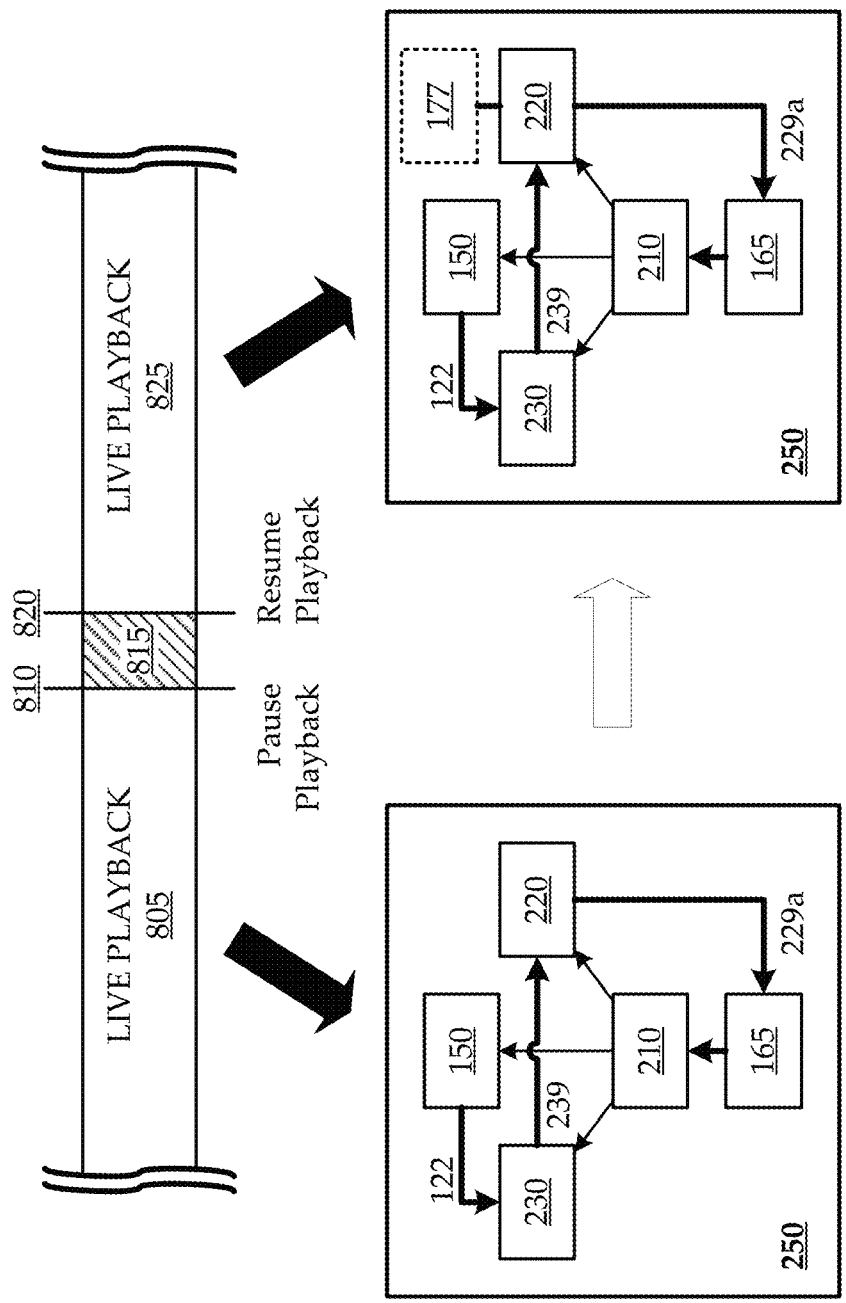
FIG. 8 shows an example of a fourth case in which a consumer pauses live-edge playback and subsequently resumes playback, still very close to the live edge, according to various embodiments.

FIG. 8 shows an example of a fourth case in which a consumer pauses live-edge playback and subsequently resumes playback, still very close to the live edge, according to various embodiments. As in FIGS. 6 and 7, live-edge playback is occurring during a first timeframe 805. As illustrated by the simplified media player system 250 on the left, using darkened arrows for active stream paths, the media player system 250 receives the live stream 122. In particular, the warm-up media player 230 pre-decodes and pre-buffers the live stream 122 to generate a warm-up stream 239, which is used by the primary media player 220 to generate and output a playback stream 229a. At some point in time 810, during the live-edge playback, a navigation interaction occurs to pause the playback. Unlike in FIGS. 6 and 7, the scenario of FIG. 8 illustrates uses of a circular buffer 177 of the primary media player 220. In some cases, this feature provides support for conventional types of "pause on live" features. For example, some implementations may not support a features, such as the implementation of FIG. 7, and instead use the circular buffer 177 for all pause transactions.

In other cases, the circular buffer 177 is used in this manner as a safety net to support certain fast navigation. For example, some embodiments described herein do not fetch a recorded-live stream 132 during live-edge playback. When playback is not being generated from the recorded-live stream 132, fetching the recorded-live stream 132 may needlessly consume bandwidth and other resources; and only the live stream 122 is fetched. As such, the media player system 250 may experience some delay when switching over to a recorded-live stream 132. With such embodiments, if a user pauses live-edge playback and quickly resumes playback (e.g., within a couple of seconds), it may be impractical to perform the type of switch-over illustrated in FIG. 7. In some embodiments, then, a short pause may be handled as described in FIG. 8, while a longer pause may be handled as described in FIG. 7.

Some embodiments of the primary media player 220 constantly maintain the circular buffer 177, and the circular buffer 177 may be sized to maintain a certain duration. For example the circular buffer 177 may be sized to maintain two seconds of content, five seconds of content, or any other suitable amount of content. Such buffering can facilitate maintaining constant playback of a content stream, even when there are temporary interruptions in network connectivity, changes in link conditions, local hardware or software issues, etc. As such, after the pause interaction occurs at time 810, there may be a some timeframe 815 (relating to the size of the circular buffer 177), during which playback can continue based on the already-decoded playback stream 229 data in the circular buffer 177. If a resume command is received at some time 820, while the playback stream 229 can still be maintained by the circular buffer, there may be no reason to switch streams (e.g., as in FIG. 7). In such cases, playback may simply resume after time 820 (in subsequent timeframe 825) in substantially the same manner as in timeframe 805. For example, it can be seen that the signal flow in the media player system 250 on the right looks substantially the same as that of the media player system 250 on the left, except that the aid of the circular buffer 177 is shown more explicitly.

Other use cases are not described, but can be addressed by embodiments described herein. For example, any change in playback location from a non-live-edge playback location to another non-live-edge playback location can simply be handled by fetching the appropriate segments of the recorded-live stream 132.

Figure 9:
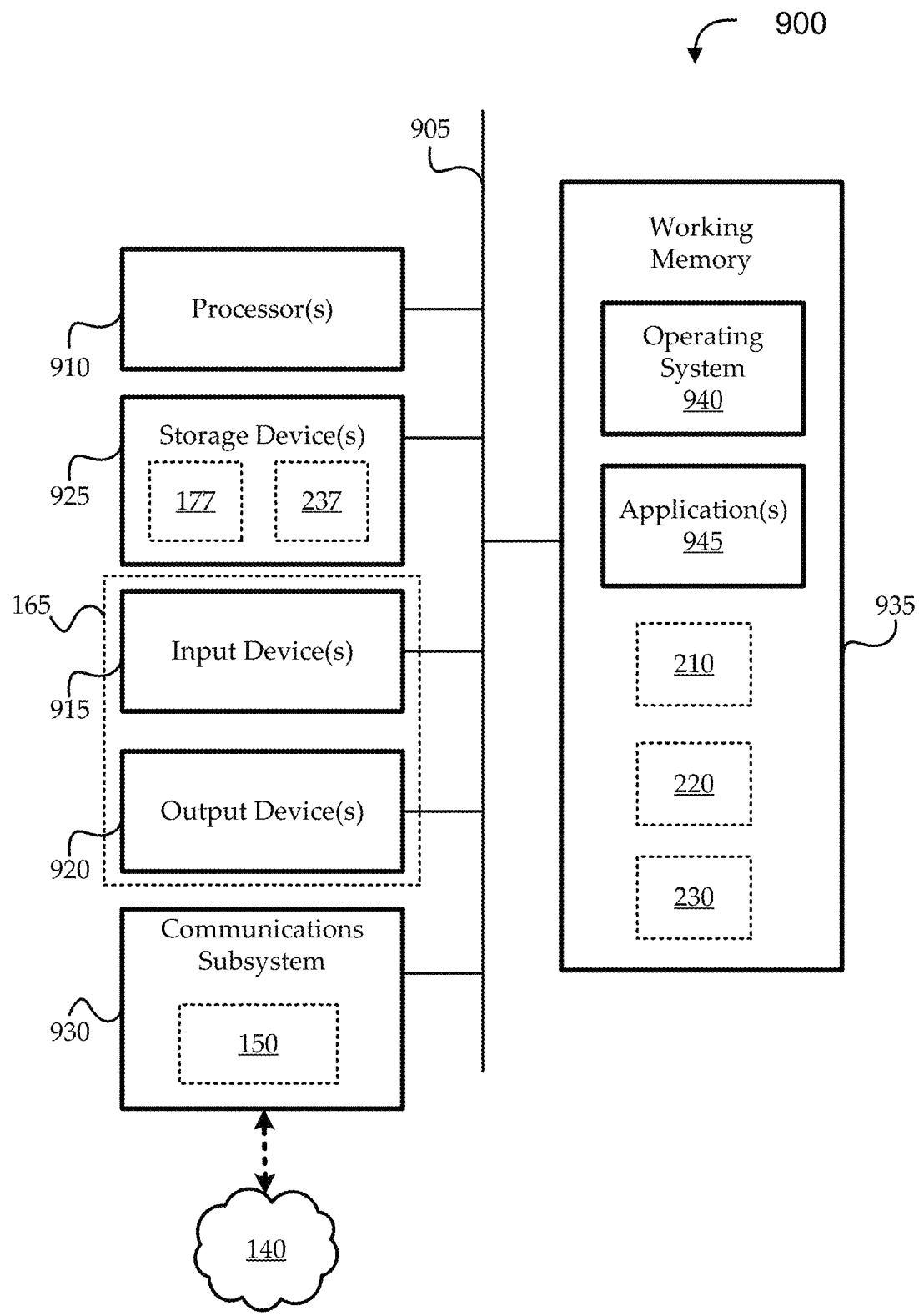
FIG. 9 provides a schematic illustration of one embodiment of a computer system that can implement various system components and/or perform various steps of methods provided by various embodiments.

For example, FIG. 9 provides a schematic illustration of one embodiment of a computer system 900 that can implement various system components and/or perform various steps of methods provided by various embodiments. Embodiments of the computer system 900 can implement some or all of the media player system 250. It should be noted that FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown including hardware elements that can be electrically coupled via a bus 905 (or may otherwise be in communication, as appropriate). The hardware elements may include one or more processors 910, including, without limitation, one or more general-purpose processors and/or one or more special-purpose processors (such as digital signal processing chips, graphics acceleration processors, video decoders, and/or the like); one or more input devices 915, which can include, without limitation, a mouse, a keyboard, remote control, touchscreen interfaces, audio interfaces, video interfaces, and/or the like; and one or more output devices 920, which can include, without limitation, display devices, printers, and/or the like. In some embodiments, the input devices 915 and output devices 920 are generally components of, and/or support features of, the user interface 165.

The computer system 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the storage devices 925 include the circular buffer 177, the pre-buffer 237, and/or any other suitable storage.

The computer system 900 can also include a communications subsystem 930, which can include, without limitation, a modem, a network card (wireless or wired), an infrared communication device, a wireless communication device, and/or a chipset (such as a Bluetooth™ device, an 902.11 device, a WiFi device, a WiMax device, cellular communication device, etc.), and/or the like. As described herein, the communications subsystem 930 supports multiple communication technologies. Further, as described herein, the communications subsystem 930 can provide communications with one or more networks 140, and/or other networks. For example, embodiments of the communications subsystem 930 can implement components of features of the network interface 150.

In many embodiments, the computer system 900 will further include a working memory 935, which can include a RAM or ROM device, as described herein. The computer system 900 also can include software elements, shown as currently being located within the working memory 935, including an operating system 940, device drivers, executable libraries, and/or other code, such as one or more application programs 945, which may include computer programs provided by various embodiments, and/or may be designed to implement methods, and/or configure systems, provided by other embodiments, as described herein. Merely by way of example, one or more procedures described with respect to the method(s) discussed herein can be implemented as code and/or instructions executable by a computer (and/or a processor within a computer); in an aspect, then, such code and/or instructions can be used to configure and/or adapt a general purpose computer (or other device) to perform one or more operations in accordance with the described methods. In some embodiments, the operating system 940 and the working memory 935 are used in conjunction with the one or more processors 910 to implement some or all of the media player system 250 components, such as the smart stream controller 210, the primary media player 220, and the warm-up media player 230.

A set of these instructions and/or codes can be stored on a non-transitory computer-readable storage medium, such as the non-transitory storage device(s) 925 described above. In some cases, the storage medium can be incorporated within a computer system, such as computer system 900. In other embodiments, the storage medium can be separate from a computer system (e.g., a removable medium, such as a compact disc), and/or provided in an installation package, such that the storage medium can be used to program, configure, and/or adapt a general purpose computer with the instructions/code stored thereon. These instructions can take the form of executable code, which is executable by the computer system 900 and/or can take the form of source and/or installable code, which, upon compilation and/or installation on the computer system 900 (e.g., using any of a variety of generally available compilers, installation programs, compression/decompression utilities, etc.), then takes the form of executable code.

In some embodiments, the computational system 900 implements a system for media playback, as described herein. The non-transitory storage device(s) 925 can have instructions stored thereon, which, when executed, cause the processor(s) 910 to implement features of the warm-up media player 230, the primary media player 220, and/or other components. For example, executing the instructions in working memory 935 can cause the processor(s) 910 to perform steps, including: receiving a first user interaction command at a first time indicating user navigation of playback of live programming content to a first playback location prior to a present live edge; directing the warm-up media player to generate a warm-up stream by pre-decoding a live content stream obtained from a live edge server as published via a provider communication network, such that the warm-up stream maintains at least the present live edge of the live programming content; directing the primary media player to first output a playback stream, responsive to the first user interaction command at the first time, by decoding a recorded-live content stream obtained from a recording server via the provider communication network and generated at the remote recording server from the live content stream as the live content stream is being published by the live edge server, such that the playback stream at the first time represents playback of the live programming content at the first playback location in accordance with the first user interaction command; receiving a second user interaction command at a second time during the first outputting, the second user interaction command indicating user navigation of the playback of the live programming content to a second playback location corresponding to the present live edge; and directing the primary media player to second output the playback stream, responsive to the second user interaction command at the second time, by decoding the warm-up stream obtained from the warm-up player, such that the playback stream at the second time represents playback of the live programming content at the second playback location in accordance with the second user interaction command.

It will be apparent to those skilled in the art that substantial variations may be made in accordance with specific requirements. For example, customized hardware can also be used, and/or particular elements can be implemented in hardware, software (including portable software, such as applets, etc.), or both. Further, connection to other computing devices, such as network input/output devices, may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which can be incorporated into the operating system 940 and/or other code, such as an application program 945) contained in the working memory 935. Such instructions may be read into the working memory 935 from another computer-readable medium, such as one or more of the non-transitory storage device(s) 925. Merely by way of example, execution of the sequences of instructions contained in the working memory 935 can cause the processor(s) 910 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 900, various computer-readable media can be involved in providing instructions/code to processor(s) 910 for execution and/or can be used to store and/or carry such instructions/ code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 925. Volatile media include, without limitation, dynamic memory, such as the working memory 935. Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 910 for execution. Merely by way of example, the instructions may initially be carried on a magnetic disk and/or optical disc of a remote computer. A remote computer can load the instructions into its dynamic memory and send the instructions as signals over a transmission medium to be received and/or executed by the computer system 900.

The communications subsystem 930 (and/or components thereof) generally will receive signals, and the bus 905 then can carry the signals (and/or the data, instructions, etc., carried by the signals) to the working memory 935, from which the processor(s) 910 retrieves and executes the instructions. The instructions received by the working memory 935 may optionally be stored on a non-transitory storage device 925 either before or after execution by the processor(s) 910.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for media playback comprising:
   receiving a first user interaction command at a first time indicating user navigation of playback of live programming content to a first playback location prior to a present live edge;
   generating a warm-up stream by pre-decoding, using a warm-up media player, a live content stream obtained from a live edge server, such that the warm-up stream maintains at least the present live edge of the live programming content, the live content stream obtained as one of a plurality of live content streams provided by the live edge server via one or more content delivery networks (CDNs) as published via a provider communication network;
   first outputting a playback stream, by a primary media player responsive to the first user interaction command at the first time, by decoding a recorded-live content stream obtained from a recording server via the provider communication network and generated at the remote recording server from the live content stream as the live content stream is being published by the live edge server, such that the playback stream at the first time represents playback of the live programming content at the first playback location in accordance with the first user interaction command, the remote recording server concurrently providing a plurality of recorded-live content streams via one or more remote storage digital video recorders (RS-DVRs), each of the plurality of recorded-live content streams corresponding to a respective one of the plurality of live content streams;
   receiving a second user interaction command at a second time during the first outputting, the second user interaction command indicating user navigation of the playback of the live programming content to a second playback location corresponding to the present live edge; and
   second outputting the playback stream, by the primary media player responsive to the second user interaction command at the second time, by decoding the warm-up stream obtained from the warm-up player, such that the playback stream at the second time represents playback of the live programming content at the second playback location in accordance with the second user interaction command.

2. The method of claim 1, wherein:
   the generating the warm-up stream comprises continually updating pre-buffering of the pre-decoded live content stream to maintains at least the present live edge of the live programming content.

3. The method of claim 1, wherein receiving the first user interaction command at the first time comprises:
   receiving a user request, via a user interface, to initiate playback of the live programming content; and
   prompting the user, via the user interface, responsive to the user request, to select between options comprising: initiating playback of the live programming content in the present live edge of the live programming content; and initiating playback of the live programming content at the first playback location,
   wherein the first user interaction command corresponds to selection by the user, responsive to the prompting, of initiating playback of the live programming content at the first playback location.

4. The method of claim 1, wherein:
   the first user interaction command is a seek back command received at the first time during playback of the live programming content at the present live edge according to using the primary media player to generate the playback stream from the warm-up stream obtained from the warm-up player; and
   the first outputting comprises, responsive to the first user interaction command:
   issuing a player request, by the primary media player to the recording server, for the recorded-live content stream at the first playback location; and
   decoding the recorded-live content stream as obtained from the remote recording server responsive to the player request.

5. The method of claim 1, further comprising:
   receiving a pause command as a third user interaction command at a third time prior to the first time, the pause command received during playback of the live programming content at the present live edge according to using the primary media player to generate the playback stream from the warm-up stream obtained from the warm-up player; and pausing the playback of the live programming content, responsive to the pause command, at a resume playback location defined by the present live edge at the third time, wherein the first user interaction command is a resume-after-pause command, and the first outputting comprises:

issuing a player request, by the primary media player to the recording server, for the recorded-live content stream at the resume playback location; and decoding the recorded-live content stream as obtained from the remote recording server responsive to the player request.

6. The method of claim 5, wherein:

the primary player comprises a circular buffer to maintain a buffered window of the playback stream having a window duration;

the first outputting further comprises:

determining whether a difference between the first time and the third time is greater than the window duration; and resuming the playback at the resume playback location from the circular buffer responsive to determining that the difference between the first time and the third time is not greater than the window duration; and the first outputting comprises the issuing the player request, and the decoding the recorded-live content stream as obtained from the remote recording server responsive to the player request, responsive to determining that the difference between the first time and the third time is greater than the window duration.

7. The method of claim 1, further comprising:

receiving a pause command as a third user interaction command at a third time prior to the first time, the pause command received during playback of the live programming content at the present live edge according to using the primary media player to generate the playback stream from the warm-up stream obtained from the warm-up player;

pausing the playback of the live programming content, responsive to the pause command, at a resume playback location defined by the present live edge at the third time; and generating the warm-up stream, responsive to the pause command, between the third time and the first time, by using the warm-up media player to pre-decode the recorded-live content stream obtained from the recording server as published via a provider communication network, such that the warm-up stream maintains a resume playback window defined according to the resume playback location, wherein the first user interaction command is a resume-after-pause command, and the first outputting comprises decoding the warm-up stream obtained from the warm-up player, such that the playback stream at the first time represents playback of the live programming content at the resume playback location in accordance with the first user interaction command.

8. The method of claim 1, wherein:

the live content stream is obtained by the warm-up media player from the live edge server by issuing a first player request to one of the one or more CDNs associated with the live edge server; and the recorded-live content stream is obtained by the primary media player from the recording server by issuing a second player request to one of the one or more RS-DVRs associated with the recording server.

9. A media playback system comprising:

a warm-up media player to couple with a live edge server via a provider communication network to obtain a live content stream comprising live programming content in accordance with a first user interaction command indicating a request for the live programming content, and to pre-decode the live content stream to generate a warm-up stream;

a primary media player to couple with a remote recording server via the provider communication network to obtain a recorded-live content stream corresponding to the live content stream in accordance with the first user interaction command and concurrent with the warm-up media player generating the warm-up stream; and a smart stream controller to direct the primary media player to output a playback stream based on a present playback state of a plurality of playback states by decoding and outputting the recorded-live content stream as the playback stream when the present playback state is any of a first subset of the plurality of playback states, and decoding and outputting the warm-up stream as the playback stream when the present playback state is any of a second subset of the plurality of playback states, the first and second subsets being disjoint subsets, the present playback state being user-navigable during outputting of the playback stream.

10. The media playback system of claim 9, further comprising:

a user interface by which to receive the first user interaction command and further to receive a second user interaction command indicating navigation of the live programming content between the plurality of playback states, such that the smart stream controller is to direct the primary media player to output the playback stream based on the present playback state as navigated responsive to the second user interaction command.

11. The media playback system of claim 9, wherein:

the warm-up player is further to pre-buffer the warm-up stream to maintain pre-decoded content in a playback window associated with a present live edge of the live content stream;

the second subset of the plurality of playback states corresponds to the present playback state being within the playback window associated with the present live edge; and the first subset of the plurality of playback states corresponds to the present playback state being outside the playback window associated with the present live edge.

12. A system for media playback comprising:

one or more processors to implement a warm-up media player and a primary media player; and a non-transient memory having processor-readable instructions stored thereon, which, when executed, cause the one or more processors to perform steps comprising:

receiving a first user interaction command at a first time indicating user navigation of playback of live programming content to a first playback location prior to a present live edge;

directing the warm-up media player to generate a warm-up stream by pre-decoding a live content stream obtained from a live edge server, such that the warm-up stream maintains at least the present live edge of the live programming content, the live content stream obtained as one of a plurality of live content streams provided by the live edge server via one or more content delivery networks (CDNs) as published via a provider communication network;

directing the primary media player to first output a playback stream, responsive to the first user interaction command at the first time, by decoding a recorded-live content stream obtained from a recording server via the provider communication network and generated at the remote recording server from the live content stream as the live content stream is being published by the live edge server, such that the playback stream at the first time represents playback of the live programming content at the first playback location in accordance with the first user interaction command, the remote recording server concurrently providing a plurality of recorded-live content streams via one or more remote storage digital video recorders (RS-DVRs), each of the plurality of recorded-live content streams corresponding to a respective one of the plurality of live content streams;

receiving a second user interaction command at a second time during the first outputting, the second user interaction command indicating user navigation of the playback of the live programming content to a second playback location corresponding to the present live edge; and directing the primary media player to second output the playback stream, responsive to the second user interaction command at the second time, by decoding the warm-up stream obtained from the warm-up player, such that the playback stream at the second time represents playback of the live programming content at the second playback location in accordance with the second user interaction command.

13. The system of claim 12, wherein:
the generating the warm-up stream comprises continually updating pre-buffering of the pre-decoded live content stream to maintains at least the present live edge of the live programming content.

14. The system of claim 12, wherein receiving the first user interaction command at the first time comprises:
receiving a user request, via a user interface, to initiate playback of the live programming content; and
prompting the user, via the user interface, responsive to the user request, to select between options comprising: initiating playback of the live programming content in the present live edge of the live programming content; and initiating playback of the live programming content at the first playback location,
wherein the first user interaction command corresponds to selection by the user, responsive to the prompting, of initiating playback of the live programming content at the first playback location.

15. The system of claim 12, wherein:
the first user interaction command is a seek back command received at the first time during playback of the live programming content at the present live edge according to using the primary media player to generate the playback stream from the warm-up stream obtained from the warm-up player; and
directing the first outputting comprises, responsive to the first user interaction command:
issuing a player request, by the primary media player to the recording server, for the recorded-live content stream at the first playback location; and
decoding the recorded-live content stream as obtained from the remote recording server responsive to the player request.

16. The system of claim 12, wherein the steps further comprise:
receiving a pause command as a third user interaction command at a third time prior to the first time, the pause command received during playback of the live programming content at the present live edge according to using the primary media player to generate the playback stream from the warm-up stream obtained from the warm-up player; and
pausing the playback of the live programming content, responsive to the pause command, at a resume playback location defined by the present live edge at the third time,
wherein the first user interaction command is a resume-after-pause command, and directing the first outputting comprises:
issuing a player request, by the primary media player to the recording server, for the recorded-live content stream at the resume playback location; and
decoding the recorded-live content stream as obtained from the remote recording server responsive to the player request.

17. The system of claim 16, wherein:
directing the first outputting further comprises:
determining whether a difference between the first time and the third time is greater than a window duration defined by a size of a circular buffer associated with the primary player to maintain a buffered window of the playback stream; and
resuming the playback at the resume playback location from the circular buffer responsive to determining that the difference between the first time and the third time is not greater than the window duration; and
directing the first outputting comprises the issuing the player request, and the decoding the recorded-live content stream as obtained from the remote recording server responsive to the player request, responsive to determining that the difference between the first time and the third time is greater than the window duration.

18. The system of claim 12, wherein the steps further comprise:
receiving a pause command as a third user interaction command at a third time prior to the first time, the pause command received during playback of the live programming content at the present live edge according to using the primary media player to generate the playback stream from the warm-up stream obtained from the warm-up player;
pausing the playback of the live programming content, responsive to the pause command, at a resume playback location defined by the present live edge at the third time; and
generating the warm-up stream, responsive to the pause command, between the third time and the first time, by using the warm-up media player to pre-decode the recorded-live content stream obtained from the recording server as published via a provider communication network, such that the warm-up stream maintains a resume playback window defined according to the resume playback location,
wherein the first user interaction command is a resume-after-pause command, and directing the first outputting comprises decoding the warm-up stream obtained from the warm-up player, such that the playback stream at the first time represents playback of the live programming content at the resume playback location in accordance with the first user interaction command.

19. The system of claim 12, wherein:
the one or more processors are further to implement a network interface to communicatively couple the warm-up media player and the primary media player with the provider network;
the live content stream is obtained by the warm-up media player from the live edge server by issuing a first player request to one of the one or more CDNs associated with the live edge server via the network interface; and
the recorded-live content stream is obtained by the primary media player from the recording server by issuing a second player request to one of the one or more RS-DVRs associated with the recording server via the network interface.

* * * * *